(12) United States Patent
    Gromotka

(10) Patent No.: US 10,573,080 B2
(45) Date of Patent: Feb. 25, 2020

(54) APPARATUS AND METHOD FOR AUGMENTED REALITY PRESENTATION

(71) Applicant: Carl Zeiss Vision International GmbH, Aalen (DE)

(72) Inventor: Jeremias Gromotka, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 15/942,609

(22) Filed: Apr. 2, 2018

(65) Prior Publication Data

US 2018/0225878 A1    Aug. 9, 2018

Related U.S. Application Data

(63) Continuation of application No. PCT/EP2016/074346, filed on Oct. 11, 2016.

(30) Foreign Application Priority Data

Oct. 13, 2015 (DE) .................. 10 2015 219 859

(51) Int. Cl.
    *G06T 19/00*    (2011.01)
    *G03H 1/22*    (2006.01)
    (Continued)

(52) U.S. Cl.
    CPC ........ *G06T 19/006* (2013.01); *G02B 27/0172* (2013.01); *G03H 1/08* (2013.01);
    (Continued)

(58) Field of Classification Search
    CPC ............... G06T 19/006; G06T 2200/21; G06T 2207/10052; G02B 27/0172;
    (Continued)

(56) References Cited

U.S. PATENT DOCUMENTS

2011/0157667 A1* 6/2011 Lacoste .............. G02B 27/2271
                                                         359/9
2014/0293386 A1  10/2014 Choi et al.
(Continued)

FOREIGN PATENT DOCUMENTS

WO    2015/032828 A1    3/2015
WO    2015/090421 A1    6/2015
(Continued)

OTHER PUBLICATIONS

Huang et al. "The Light Field Stereoscope: Immersive Computer Graphics Factored Near-Eye Light Field Displays with Focus Cues," ACM Transactions on Graphics, vol. 34, No. 4, Artikcle 60, Aug. 2015.
(Continued)

*Primary Examiner* — Phuc N Doan
(74) *Attorney, Agent, or Firm* — Thrive IP®; Georg Hasselmann

(57) ABSTRACT

An augmented reality (AR) system includes a head-mounted display (HMD) with a holographic display, a device for generating virtual reality (VR) light field data, a device for recording light field data of the environment, and a device for combining the light field data of the environment and the VR light field data to form augmented reality (AR) light field data and controlling the holographic display. They AR system further includes a device for correcting the AR light field data on the basis of ophthalmological data of a user. The complete computer-generated AR presentation makes possible a common and uniform adaptation and correction of the presentation in respect of vision defects of the user.

11 Claims, 2 Drawing Sheets

(51) Int. Cl.
G02B 27/01 (2006.01)
G03H 1/08 (2006.01)
(52) U.S. Cl.
CPC ..... *G03H 1/2294* (2013.01); *G02B 2027/014* (2013.01); *G02B 2027/0138* (2013.01); *G02B 2027/0174* (2013.01); *G02B 2027/0178* (2013.01); *G02B 2027/0181* (2013.01); *G03H 2227/02* (2013.01); *G06T 2200/21* (2013.01); *G06T 2207/10052* (2013.01)
(58) Field of Classification Search
CPC ...... G02B 2027/0138; G02B 2027/014; G02B 2027/0174; G02B 2027/0178; G02B 2027/0181; G03H 1/08; G03H 1/2294; G03H 2227/02
See application file for complete search history.

(56) References Cited

U.S. PATENT DOCUMENTS

2015/0054734 A1  2/2015  Raghoebardajal et al.
2015/0146032 A1  5/2015  Rime et al.
2015/0262424 A1* 9/2015  Tabaka ............... G02B 27/0075
                                                    345/633
2015/0278604 A1  10/2015  Shuster et al.
2016/0216515 A1* 7/2016  Bouchier ............. G03H 1/0808
2018/0196265 A1* 7/2018  Bouchier ........... G02B 27/0172

FOREIGN PATENT DOCUMENTS

WO        2015/179446 A1    11/2015
WO        WO2016019204    *  2/2016  ......... G02B 27/0103
WO        WO2016149416    *  9/2016  ............. G02B 27/22

OTHER PUBLICATIONS

International Search Report and English-language translation thereof issued in PCT/EP2016/074346, of which this application is a continuation, dated Dec. 9, 2016.
International Preliminary Examination Report and English-language translation thereof issued in PCT/EP2016/074346, of which this application is a continuation, completed Jan. 16, 2018.

* cited by examiner

APPARATUS AND METHOD FOR AUGMENTED REALITY PRESENTATION

CROSS REFERENCE TO RELATED APPLICATIONS

This application is a continuation application of international application PCT/EP2016/074346, filed Oct. 11, 2016, which claims priority to German patent application DE 10 2015 219 859.6, filed on Oct. 13, 2015, both of which are hereby incorporated by reference in their entireties.

TECHNICAL FIELD

The disclosure relates to an augmented reality (AR) system, having a head-mounted display (HMD) with a holographic display and a device for generating virtual reality (VR) light field data. The subject matter of the disclosure relates furthermore to a method for presenting AR presentations in or using a system according to the disclosure.

BACKGROUND

VR systems are known from prior public use. They permit presentation of a computer-generated virtual presentation or reality to a user.

Likewise known are AR systems, in which the user can directly optically perceive the environment, and, in addition, VR data appear in his field of view. With these AR systems, additional information in the form of VR data can be made available to a user upon looking at the environment. One known AR system is Google Glass®.

WO 2015/032828 A1 describes an AR system, which provides a correction of the introduced VR data on the basis of ophthalmological parameters of the user.

SUMMARY

It is an object of the present disclosure to provide an AR system and a method of presenting AR, which offers good AR presentation and a simple option for adapting to different users.

This object is achieved according to the disclosure by way of the system including a device for recording light field data of the environment and a device for combining the light field data of the environment and the VR light field data to form AR light field data and controlling the holographic display, wherein a device for correcting the AR light field data on the basis of ophthalmological data of the user is provided.

Firstly, some terms used in the context of the disclosure are explained.

AR systems permit the simultaneous visual perception of both the environment (either directly or indirectly by presenting a camera recording of the environment) and, additionally, of optically superposed or overlaid graphic data for a user, the data being, for example, images, alphanumeric characters, or the like.

HMDs are visual output devices that are supported on the head of a user and can present optical data and images to the user. For example, HMDs can take the form of spectacles, masks, helmets, contact lenses, or the like. In the context of the disclosure, closed HMDs are typically used, which let the user perceive only computer-generated optical presentations and do not permit direct visual perception of the environment.

A holographic display is a device that can present a computer-generated holographic interference pattern image that corresponds in the perception to a stereoscopic image. Holographic displays are known in the related art and described, for example, in US 2014/0293386 A1.

A device for generating VR light field data produces VR light field data that permit 3D presentation of the (synthetic) graphic data with a holographic display.

Light field data are described by a vector function that describes the radiance of the light for each point in space and for each direction in space.

A device for recording light field data of the environment permits capturing the light field of an observed environment or scene. This device is typically embodied according to an aspect of the disclosure as a light field camera or plenoptic camera. In principle, light field data of the environment can also be recorded in a different manner, for example by way of multiple exposure of a regular image sensor with varying focal length. The device typically permits the recording and creation of light field data of the environment in real time.

An exemplary embodiment of the disclosure is a device for combining the light field data of the environment and the VR light field data to form AR light field data. According to an aspect of the disclosure, provision is thus made for the AR presentation not to be a mixed presentation of a direct optical perception of the environment with added VR data, but for the entire AR presentation including the presentation of the environment to be generated by a computer using the holographic display.

The VR light field data that are combined with light field data of the environment can include computer-generated or simulated data, and they can also include data from a light field camera that is arranged at a spatial distance, for example for telepresence applications.

This procedure in accordance with an aspect of the disclosure permits the application of all possibilities for presentation and possibly correction of light field data which are presented using a holographic display not only to the VR elements of a mixed AR presentation with direct perception of the environment, but also to the overall presentation including the environment and thus the perception of the environment.

The system includes a device for correcting the AR light field data on the basis of ophthalmological data of the user.

The term ophthalmological data of the user refers to data that comprise information relating to the individual eyesight or the vision characteristics of a user. They can typically be prescription data that record defined types of defective vision of the user. Such prescription data are, for example, sphere; cylinder, and axis (correction of astigmatism); prismatic correction; higher-order aberrations; addition (correction of presbyopia); and the like.

However, the information relating to the individual eyesight or the vision characteristics can also be other ophthalmological data, for example prescribed data in connection with the ascertainment of ophthalmological data of a user.

The data can furthermore be sensitivity data that describe for example the spectral sensitivity or brightness sensitivity of the eyes. The knowledge of the spectral sensitivity allows according to an aspect of the disclosure for example the correction of color vision defects. The knowledge of the brightness sensitivity, for example, permits the adaptation of the contrast of the generated AR image to the properties of the eyes.

The data can furthermore be biometric data of the user, including for example pupil distance, axial length of the eyes, orientation of the center of rotation of the eyes, and the like.

The disclosure makes it possible to offer an AR presentation to a user, in which both the presentation of the environment and also the additional visual VR data are corrected together for example for compensating a defective vision of the user. According to an aspect of the disclosure, it is no longer necessary to provide the double correction that is common in AR systems of the related art, in which the direct visual perception of the environment must be corrected by way of typical optical elements, such as for example spectacle lenses, which in the related art, for example, can be placed into the HMD that is used.

The device for recording light field data of the environment is typically in the form of a light field camera that permits recording of the light field data in real time. More typically, the device for recording light field data is coordinated with the viewing direction of the user. In this way, the environment is realistically reproduced while taking into account the viewing direction. For this purpose, the light field camera can be mechanically coupled to the HMD, in particular, be attached thereto. Thereby the light field camera follows the head movements of the user. Alternatively or additionally, a viewing direction sensor can be provided in the HMD, which captures eye movements and the viewing direction and typically controls a tracking movement of the camera.

Within the context of the disclosure, it is likewise possible for the camera to be arranged at a spatial distance from the HMD or from the user of the HMD. Such a spatially remote arrangement is typically used for telepresence applications. More typically, such a spatially remote camera is controllable by the HMD in wire-bound or typically wireless fashion such that the recording direction of the camera is linked to the viewing direction of the user of the HMD or follows the viewing direction. By way of example, the HMD can include accelerometers that capture head movements of the user and thus provide a control variable for the tracking movement of the remote camera.

According to an aspect of the disclosure, it is typical for the device for generating VR light field data to be connectable to an external data source. This can be an external data source (for example databases or generally the Internet) that contributes content for the VR presentation.

Alternatively or additionally, provision may be made not only for a connection to an external data source, but also for a connection to an external computer, whose computational power is used for example for processing light field data, controlling the holographic display or the like. This variant of the disclosure allows computationally complex processing of light field data to be relocated to high-capacity external computers.

The connection of an external data source or external computer and the system according to an aspect of the disclosure or a HMD is typically wireless, and common electromagnetic or optic wireless connection techniques can be used. If available in the relevant environment, optical connections have the advantage that broadband transfer is possible without difficulty and exposure of the head region of the user to electromagnetic radiation can be avoided.

According to an aspect of the disclosure, provision may be made for the external data source to additionally include ophthalmological data of the user. This can be beneficial in particular if a system according to the aspect of the disclosure is used by different users having different defective vision. By access to the external data source, automatic adaptation to the respective user can take place. Alternatively, the corresponding ophthalmological data can be stored locally in the system according to another aspect of the disclosure or in the HMD.

Very common types of defective vision are nearsightedness or farsightedness, which require spherical correction of the focal plane. Provision may be made according to an aspect of the disclosure for the device for combining the light field data of the environment and the VR light field data to form AR (augmented reality) light field data and for controlling the holographic display to be configured for presenting, from the AR light field data, the focal plane that corresponds to the spherical vision defect of the eye for each eye of the user. In this exemplary embodiment of the disclosure, it is possible in each case to generate and use only the focal planes that correspond to the vision defects of the left or right eye of the wearer. Such a procedure requires comparatively low computational power and consequently facilitates the performance of the calculations for correcting the AR light field data on the basis of ophthalmological data of the user locally in the region of the system or HMD.

According to another aspect of the disclosure, it is typical for the HMD or the holographic display thereof to include a spatial light modulator (SLM). Suitable SLMs are familiar to those skilled in the art and do not require a more detailed explanation here. A disclosure of suitable SLMs can be found, for example, in WO 2015/032828 A1, which was mentioned in the introductory part.

The SLM can be embodied according to an aspect of the disclosure for example as a reflective or transmissive SLM. One example of a transmissive SLM are stacked liquid crystal (LC) displays, as are described, for example, in the publication Huang et. al., "The Light Field Stereoscope," retrievable at www.computationalimaging.org/publications/the-light-field-stereoscope/. Reference is made to this disclosure.

The system according to an aspect of the disclosure typically additionally has a viewing direction sensor. Capturing the viewing direction can be useful or required in particular if defective vision that is dependent on the viewing direction, such as astigmatism, is intended to be corrected in accordance with an aspect of the disclosure. According to another aspect of the disclosure, provision may thus be made for the viewing direction of the user, which is captured by the viewing direction sensor, to be included in the correction of the AR light field data on the basis of ophthalmological data of the user.

A further aspect of the disclosure is a method for generating or presenting AR presentations using a system, or in a system, having the steps of recording light field data of the environment, generating VR light field data, combining the light field data of the environment and the VR light field data to form AR light field data, modifying the AR light field data on the basis of ophthalmological data of the user, and presenting the modified AR presentation in the HMD.

As has already been described in the context of the system according to an aspect of the disclosure, it is typical for the modification to comprise the generation of the focal planes that correspond to the spherical vision defects of the respective eye of the user.

It is furthermore typical for the modification to be affected while taking into account the viewing direction of the user that is captured by the viewing direction sensor.

BRIEF DESCRIPTION OF THE DRAWINGS

Exemplary embodiments of the disclosure are described below with reference to the drawings, wherein.

DESCRIPTION OF EXEMPLARY EMBODIMENTS

Figure 1:
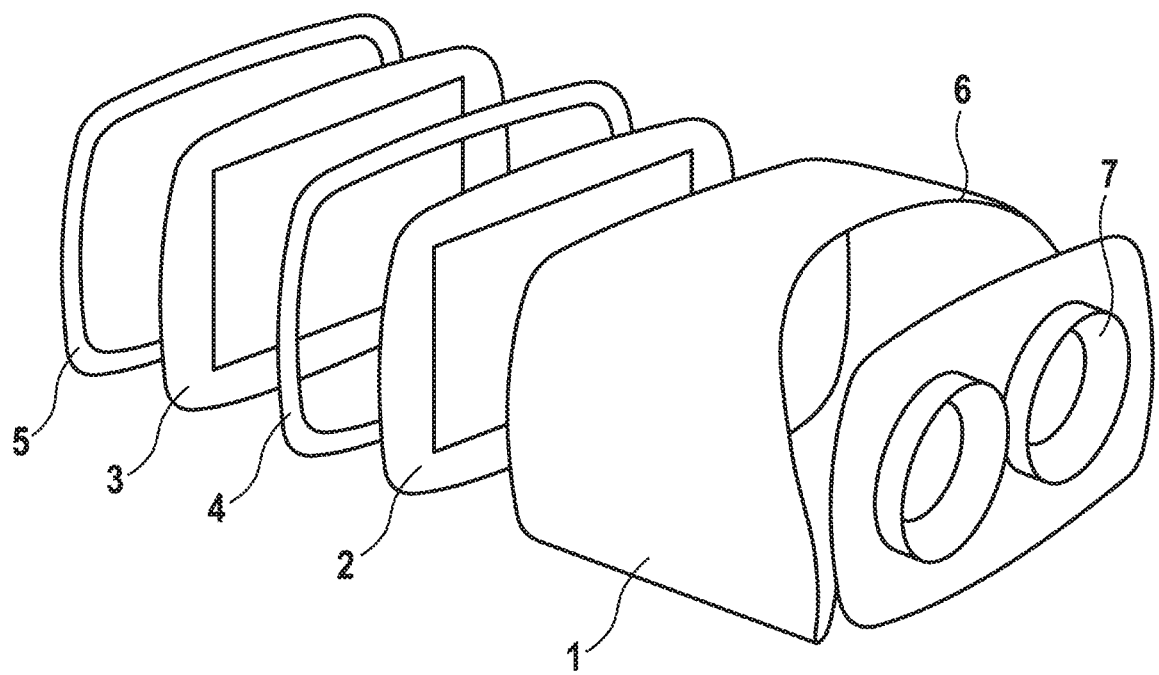
FIG. 1 schematically shows an exploded view of a HMD of a system according to an exemplary embodiment of the disclosure.

FIG. 1 shows housing 1, in which two LC displays 2, 3 are arranged at a distance from one another that is determined by the spacer 4. These two displays together form an SLM, as described above.

The displays are backlit by a backlight device 5.

The components mentioned are arranged in the closed housing 1, which has, at the front side, an opening or cutout 6 that is approximately adapted to the head shape of a user and serves for substantially enclosing a HMD that is positioned in front of the eyes of a user such that it is light-tight.

The look the user casts onto the image that is presented by the LC displays is conveyed schematically by way of lens elements indicated schematically with 7.

Depending on the exemplary embodiment of the display, additional lens elements are not absolutely necessary, but may be desirable, e.g., as UV, blue light, or contrast filters.

A physical separation of the presentation for the right and the left eye may be useful depending on the display used, albeit not absolutely necessary in certain circumstances.

The HMD in an exemplary embodiment of the disclosure can have a light field camera that is fixedly connected thereto (not illustrated in the drawing), which can be arranged for example at the side of the HMD that is remote from the lens elements 7 and automatically follows the viewing direction of the user as a result of the fixed connection to the HMD.

Figure 2:
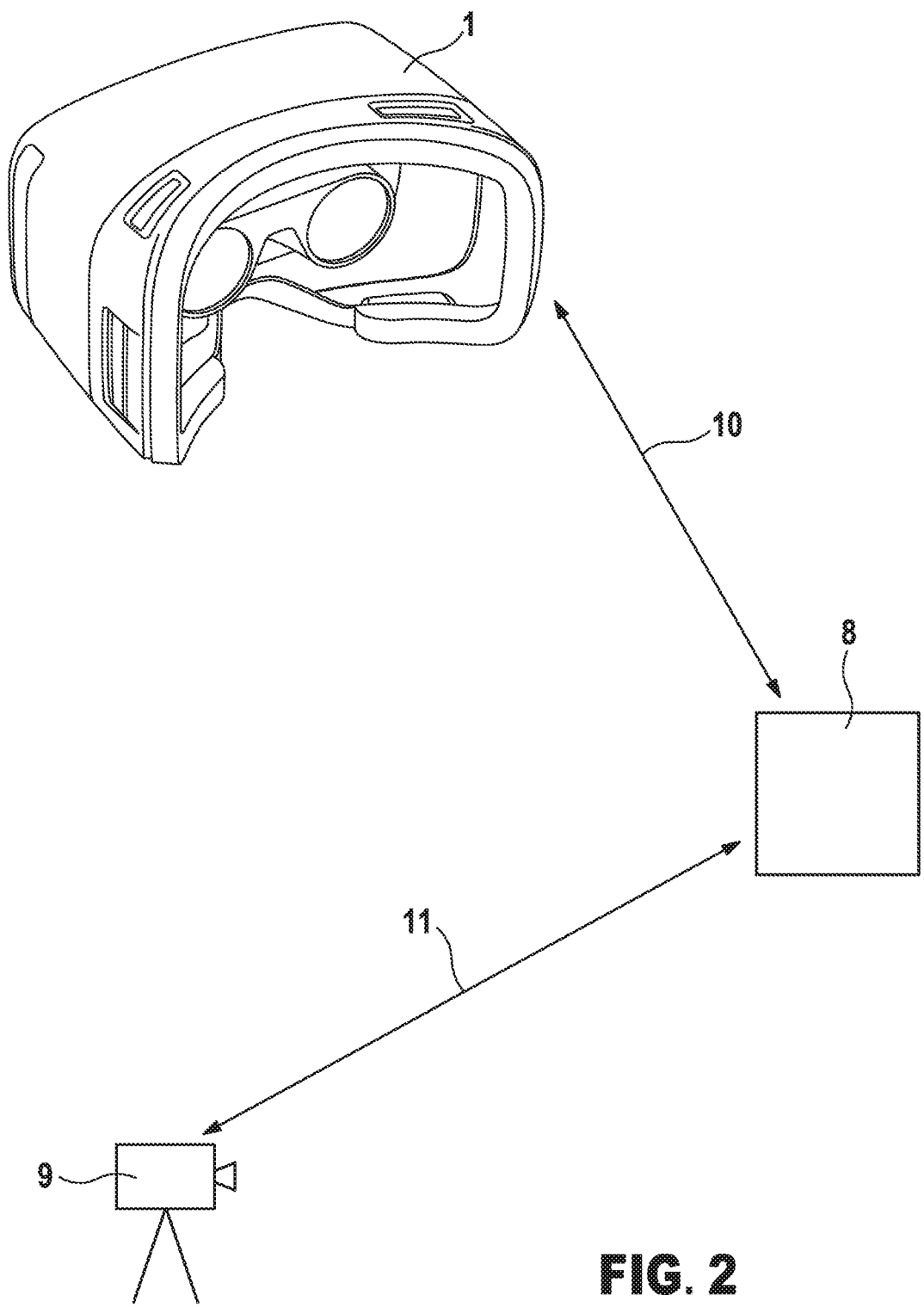
FIG. 2 schematically shows a system according to an exemplary embodiment of the disclosure having a remotely arranged camera.

In FIG. 2, another exemplary embodiment of the disclosure is shown, in which the camera 9 can be arranged to be physically separate. In that case, devices are typically provided that ensure, by way of a data link 10, 11, that the camera, which is arranged at a spatial distance, moves according to the head movements of the user of the HMD and consequently follows his or her (imaginary) viewing direction. A camera of this type, which is arranged at a spatial distance, can be used, for example, for making a system according to the disclosure utilizable for telepresence events.

In the exemplary embodiment of FIG. 2, a device for generating VR light field data is schematically illustrated as an external computer 8 that is connected to the HMD via a data link 10. This computer 8 may or may not be structurally connected to or integrated in the HMD 1.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. An augmented reality (AR) system for generating an AR presentation, the system comprising:
   a head mounted display (HMD) having a holographic display;
   a device configured to generate virtual reality (VR) light field data;
   a recording device configured to record light field data of the environment;
   a control device configured to combine the light field data of the environment and the VR light field data to form AR light field data, control the holographic display, and present, from the AR light field data, generated focal planes that correspond to a spherical vision defect of an eye for each eye of the user; and
   a correction device configured to correct the AR light field data based on ophthalmological data of a user,
   wherein the AR presentation presented on the holographic display includes the AR light field data formed by the control device, and wherein the light field data of the environment is entirely computer-generated.

2. The system as claimed in claim 1, wherein the ophthalmological data of the user are selected from a group consisting of prescription data, biometric data, and sensitivity data.

3. The system as claimed in claim 1, wherein the recording device configured to record the light field data of the environment is a light field camera.

4. The system as claimed in claim 1, wherein the recording device configured to record the light field data is coordinated with a viewing direction of the user.

5. The system as claimed in claim 1, wherein the device configured to generate the VR light field data is connectable to an external data source.

6. The system as claimed in claim 5, wherein the external data source further comprises the ophthalmological data of the user.

7. The system as claimed in claim 1, wherein the HMD comprises a spatial light modulator (SLM).

8. The system as claimed in claim 1, further comprising a viewing direction sensor.

9. The system as claimed in claim 8, wherein a viewing direction of the user, which is captured by the viewing direction sensor, is included in the correction of the AR light field data based on the ophthalmological data of the user.

10. A method for presenting AR presentations in the system as claimed in claim 1, the method comprising:
    recording the light field data of the environment;
    generating the VR light field data;
    combining the recorded light field data of the environment and the generated VR light field data to form the AR light field data;
    modifying the AR light field data based on the ophthalmological data of the user by generating the focal planes that correspond to the spherical vision defects of respective eyes of the user; and
    presenting the modified AR light field data on the holographic display of the HMD, the modified AR light field data including the recorded light field data of the environment, the recorded light field data of the environment being entirely computer-generated.

11. The method as claimed in claim 10, further comprising capturing a viewing direction with a viewing direction sensor, wherein the modifying is affected by taking into account the viewing direction of the user captured by the viewing direction sensor.

* * * * *

UNITED STATES PATENT AND TRADEMARK OFFICE
CERTIFICATE OF CORRECTION

PATENT NO. : 10,573,080 B2
APPLICATION NO. : 15/942609
DATED : February 25, 2020
INVENTOR(S) : Jeremias Gromotka Page 1 of 1

It is certified that error appears in the above-identified patent and that said Letters Patent is hereby corrected as shown below:

On the Title Page

In the abstract: change "They AR" to -- The AR --.

In the Claims

Column 6, Line 19, Claim 1, change "the user" to -- a user --.

Column 6, Line 21, Claim 1, change "a user" to -- the user --.

Signed and Sealed this
Seventh Day of April, 2020

Andrei Iancu
*Director of the United States Patent and Trademark Office*